United States Patent [19]

Hubbard, Jr.

[11] Patent Number: 4,907,348
[45] Date of Patent: Mar. 13, 1990

[54] NAVIGATIONAL TAPE MEASURE-TYPE APPARATUS

[76] Inventor: Elmer A. Hubbard, Jr., P.O. Box 669, Flagstaff, Ariz. 86002

[21] Appl. No.: 212,336

[22] Filed: Jun. 27, 1988

[51] Int. Cl.$^4$ ............................................... G01B 3/10
[52] U.S. Cl. ....................................... 33/767; 242/107; 242/107.4 R; 33/761; 33/431; 33/759
[58] Field of Search ................. 33/138, 431, 457, 759, 33/767, 1 MP, 1 PT; 242/84.8, 107, 107.2, 107.4 R

[56] References Cited

U.S. PATENT DOCUMENTS

| | | | |
|---|---|---|---|
| 1,233,034 | 7/1917 | Crogan | 242/84.8 |
| 1,638,914 | 8/1927 | Brush | 33/431 |
| 1,877,435 | 9/1932 | Trenor | 33/431 |
| 1,986,551 | 1/1935 | Anderson | 33/138 |
| 2,080,815 | 5/1937 | Gasstrom | 242/84.8 |
| 2,132,202 | 10/1938 | Carlson | 242/84.8 |
| 2,207,277 | 7/1940 | Volz | 33/138 |
| 2,446,020 | 7/1948 | Nicholson et al. | 242/84.8 |
| 2,503,440 | 4/1950 | Johanningmeier | 242/107.2 |
| 2,599,320 | 6/1952 | Dart | 242/84.8 |
| 2,616,635 | 11/1952 | Carlson | 242/107.2 |
| 2,695,454 | 11/1954 | Dart | 33/138 |
| 3,401,879 | 9/1968 | Close | 33/767 |
| 3,651,574 | 3/1972 | Burkart | 33/431 |
| 3,662,969 | 5/1972 | King | 242/84.8 |
| 4,527,334 | 7/1985 | Jones et al. | 33/138 |
| 4,555,854 | 12/1985 | Kuntze | 33/138 |
| 4,574,486 | 3/1986 | Drechsler | 33/138 |
| 4,578,867 | 4/1986 | Czerwinski et al. | 33/138 |
| 4,687,155 | 8/1987 | Burton | 33/138 |
| 4,729,171 | 3/1988 | Samson | 33/138 |
| 4,730,783 | 3/1988 | Lamson | 33/138 |

FOREIGN PATENT DOCUMENTS

| | | | |
|---|---|---|---|
| 3323706 | 12/1984 | Fed. Rep. of Germany | 33/767 |
| 1348499 | 12/1963 | France | 33/138 |
| 2552872 | 4/1985 | France | 33/767 |
| 327773 | 3/1958 | Switzerland | 33/138 |
| 345448 | 3/1931 | United Kingdom | 33/138 |
| 942381 | 11/1963 | United Kingdom | 242/84.8 |
| 989887 | 4/1965 | United Kingdom | 33/138 |
| 1009874 | 11/1965 | United Kingdom | 242/84.8 |

Primary Examiner—William A. Cuchlinski, Jr.
Assistant Examiner—Diego F. F. Gutierrez
Attorney, Agent, or Firm—Charles P. Padgett, Jr.

[57] ABSTRACT

A tape measure-type apparatus including a teardrop-shaped housing having a hollow interior. The housing has a rounded rear portion for storing a self-biased steel strip adapted to wind itself into a coil within the hollow interior of the rounded portion. The front portion of the housing is tapered in the form of a triangle whose base is the diameter through the center of the rounded portion and whose sides converge at the vertex to form the tape inlet/outlet opening. The edges of the housing along the triangular leg portions are relatively flat so that the apparatus can be laid on a flat surface on which length or distance is to be measured and used either right-side-up or up-side-down with equal facility for using either the top surface or the bottom surface of the tape strip for measurement purposes. In this matter, the top and bottom surfaces can be graduated in the same or different units adapted for one use on the top surface and a different and distinct use on the bottom surface. In the preferred embodiment, the graduations on the surfaces are adapted for use by airmen, pilots, navigators, seamen and the like. For example, both sides of the tape strip can be graduated in scales for measuring nautical miles, statute miles, and kilometers, and one side can be scaled for use with a conventional aeronautical chart such as a WAC chart while the other is scaled for use with a second different and distinct aeronautical chart or map having a different scale such as a SECTIONAL chart. A rod assembly is biased to a first position for normally gripping the edges of the tape for preventing it from automatically rewinding back up into a coil within the hollow interior. A push button portion of the rod assembly can be manually depressed for laterally shifting the rod assembly to a second position and releasing the tape to allow it to automatically rewind back up into the interior.

45 Claims, 3 Drawing Sheets

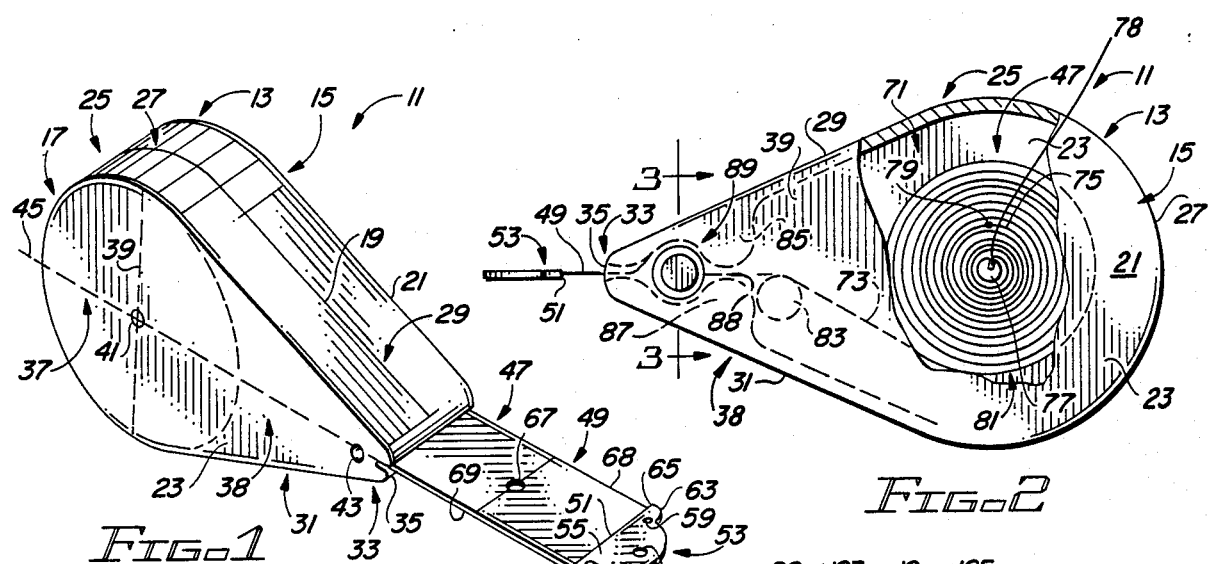

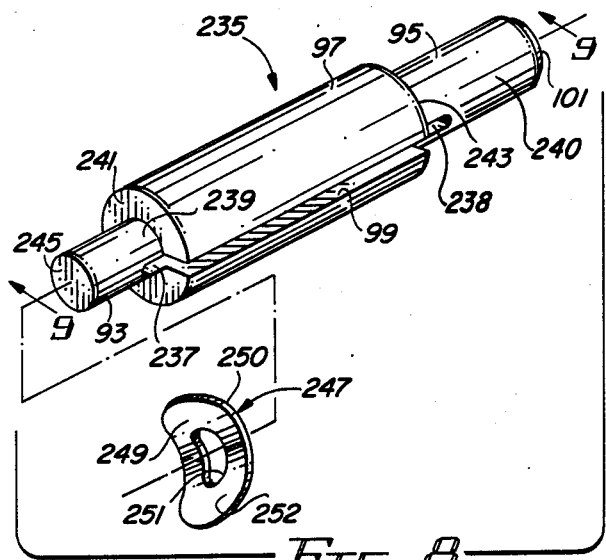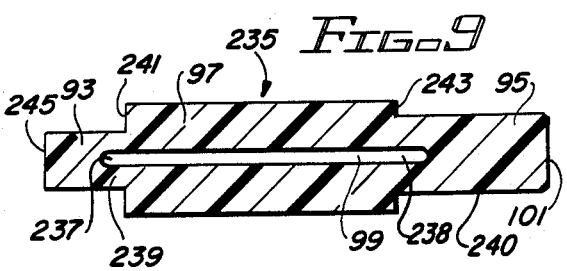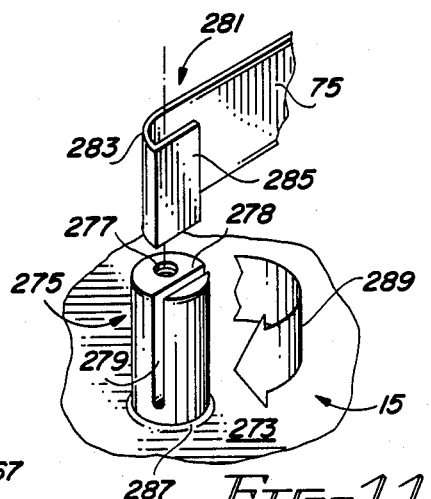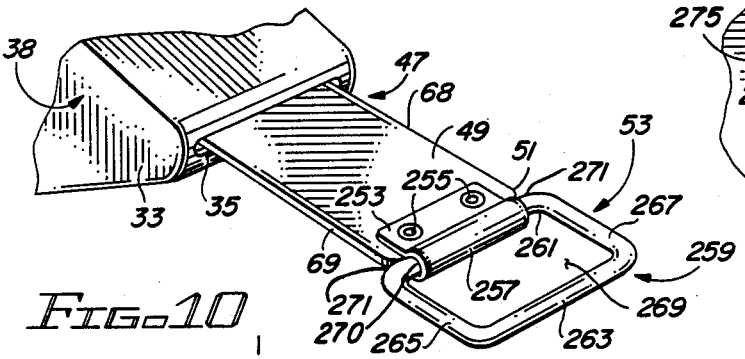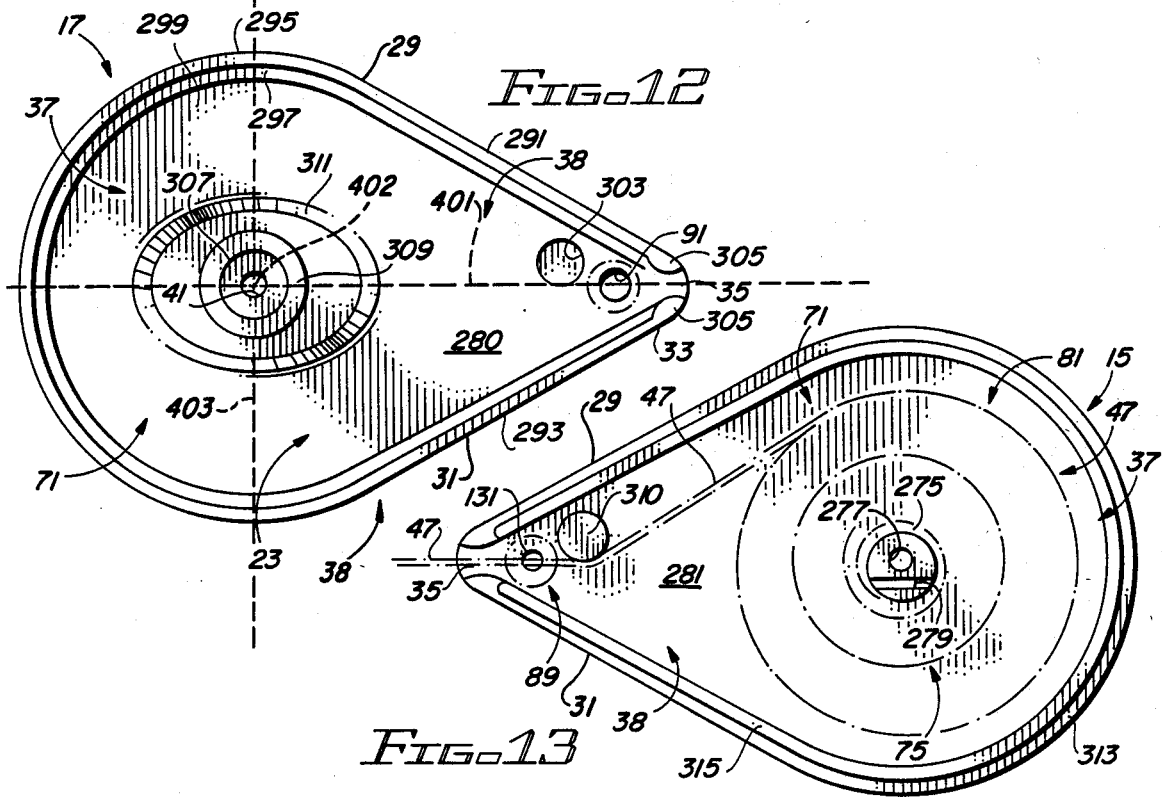

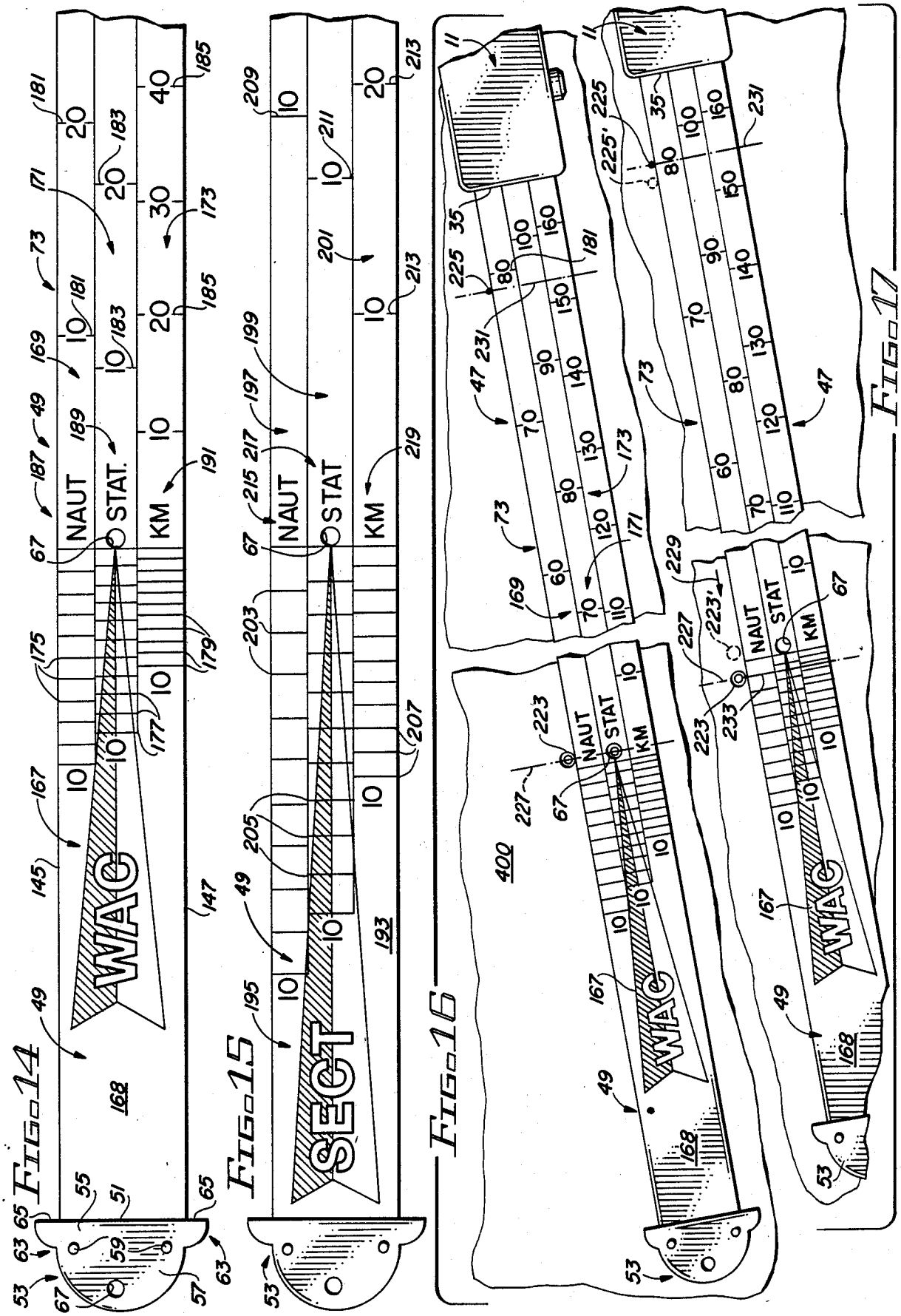

NAVIGATIONAL TAPE MEASURE-TYPE APPARATUS

BACKGROUND OF THE INVENTION

1. Field Of The Invention

The present invention relates generally to a tape measure-type apparatus, and more particularly to a distance-measuring tape measure-type apparatus having the same set of scales on both sides of the tape for two separate, different and distinct uses. Even more particularly, the present invention relates to an airman's or pilot's distance-measuring tape having a set of graduated scales on both sides of the tape for measuring distances in one or more of nautical miles, statute miles, and kilometers, and having one side calibrated for a first conventional aeronautical chart and the opposite side calibrated for a second different and distinct aeronautical chart.

2. Description Of The Prior Art

Many types of navigational instruments have been used in the prior art for measuring distances and/or course headings between a point of departure or a first point and a point of destination or a second point on aeronautical navigational charts. Instruments such as protractors, compasses, dividers, and rulers having distance scales thereon have been tried. Most are too complicated, cumbersome, and limited in use, and they require too much time and to many motions to plot and measure a course. A pilot generally needs a quick and easy way to measure distance accurately on an aeronautical chart.

Furthermore, most pilots and navigators today use a relatively short ruler having a straight edge calibrated in only one of nautical mile, statute miles or kilometers and useful with only one type of aeronautical chart having miles or kilometers. These short rulers are inaccurate, prone to error, difficult to use when long distances are involved, and limited in use with any other type of aeronautical chart or with different types of distance-measuring scales.

In time, the industry has migrated toward to the use of such relatively short rulers which have many different and often confusing scales provided on them. In measuring long distances on an aeronautical chart, the short rulers are cumbersome and relatively inaccurate. If the scales on the charts themselves are used, then some other device must be used as a yard stick, compass, dividers, string or the like, which again is very clumsy, difficult to use, and inaccurate.

For example, U.S. Pat. No. 3,651,574 illustrates an extremely awkward, cumbersome, difficult-to-use apparatus for measuring distance and plotting a course heading. In this invention, one end of the device must be physically aligned with an edge of the chart, a slide must be extended, and a ruler mounted on a compass rose must be rotated so that a tape strip can be stretched from point of destination to point of departure. The graduated scale on this particular tape role is only disposed on one side of the tape strip, and it's designed so that it could not be used or pulled out with its opposite side face up. It is calibrated in only one set of units such as statute miles, kilometers, or nautical miles. While the tape can be moved, by rotating it ninety degrees, this is only to move it from a "use" position to a "storage" position, and not to access the opposite side of the tape. This instrument is limited to use in one distance scale on either of two types of aeronautical charts which means you would need a second totally separate instrument if you wanted to measure in different distance units.

The present invention solves substantially all of the problems of the prior art by providing a simple, compact, light-weight, non-cumbersome, easy-to-use, easy-to-read, easy-to-store measuring device which can be used to quickly and easily measure distances on two different and distinct types of aeronautical charts and in a plurality of distance-measuring units such as nautical miles, statute miles, and/or kilometers.

SUMMARY OF THE INVENTION

It is an object of the present invention to provide an improved shape for a tape measure for enabling it to be used equally as well with either side or surface of the tape.

It is another object of the present invention to provide a tape measure apparatus having a teardrop-shaped housing which includes a front portion which is generally triangular such that the opposite legs of the triangular portion taper inwardly toward one another to converge about the vertex of the triangle and form the inlet/outlet thereof, such that either leg portion of the triangle can be placed level on a flat surface for enabling either side of the tape to be used.

It is still another object of the present invention to provide an improved navigational aid for pilots, navigators, seamen and the like for quickly and easily measuring distances on a navigational chart.

It is yet another object of the present invention to provide a two-sided tape measure with each side being graduated in one or more of nautical miles, statute miles, and kilometers, such that one surface of the tape is scaled for a first type of aeronautical chart, and the opposite surface is scaled for a second different and distinct type of aeronautical chart.

It is a further object of this invention to provide an airman's tape for enabling a pilot, navigator, or the like to measure distances quickly and accurately in any one of nautical miles, statute miles, or kilometers and on either a conventional WAC chart or a conventional SECTIONAL chart.

It is still a further object of the present invention to provide an improved tape measure-type device including means for normally gripping the lateral side edges of the tape once a length thereof has been pulled from the housing to prevent its rewinding into the interior of the housing and including a push button means for releasing the edge grip and allowing the tape to automatically rewind into a coil within the hollow interior of the housing.

It is yet a further object of the present invention to provide a two-sided navigational tape including an aperture positioned on the longitudinal axis of the tape and adjacent the front end thereof for enabling the front end to be anchored or pinned at a selective point on the chart for distance-measuring purposes.

It is another object of the present invention to provide a distance-measuring tape apparatus wherein one surface of the tape is capable of a first use and the opposite surface of the tape is calibrated for a second, different and distinct type of use.

It is still another object of this invention to provide such a distance-measuring tape apparatus wherein one side of the tape can be used for one type of aeronautical chart or map having a first scale while the opposite side can be used with a different and distinct type of aeronautical chart or map having a second different and distinct scale.

It is yet another object of the present invention to provide such a distance-measuring tape apparatus wherein the first side of the tape can be used with a conventional WAC chart and wherein the opposite side is calibrated for use with a conventional SECTIONAL chart.

It is still a further object of this invention to provide such a distance-measuring tape wherein either one of the sides of the tape can be read in distance units of nautical miles, statute miles, or kilometers, as desired.

It is yet another object of this invention to provide a simple, light-weight, easy-to-carry, easy-to-use, easy-to-store, highly accurate distance measuring tape measure-type apparatus which can be laid flat on a surface on which distance is to be measured such that the desired tape surface to be used is always face up. It is another object of this invention to provide a distance-measuring tape measure-type apparatus having a teardrop-shaped housing.

The distance-measuring navigational aid apparatus of the present invention includes a housing having a pair of opposing parallel sides, a lateral edge portion interconnecting the sides to form a hollow interior therebetween and a slotted opening through one section of the lateral edge portion for serving as an inlet/outlet for the tape stored therein. An elongated, relatively thin, relatively narrow strip of spring steel having a front end portion, a rear end portion, an intermediate portion operatively disposed between the end portions, a top surface, and a bottom surface is provided. The elongated strip is self-biased to automatically wind itself into a coil within the hollow interior of the housing. The front end portion extends at least partially through the slotted opening and includes a tab member for preventing the strip from rewinding completely into the hollow interior of the housing through the slotted opening.

Graduation means are provided on each surface of the tape in a plurality of distance-measuring scales. The graduation means disposed on the top surface of at least the elongated intermediate portion of the tape strip is calibrated for a first predetermined type of aeronautical chart while the graduation means for the different distance scales on the bottom surface of at least the elongated intermediate portion of the tape strip is calibrated for a second different and distinct aeronautical chart. A manually-operable push button assembly means is normally biased in a first position for gripping the lateral side edges of the tape strip and locking it against rewinding back into the hollow interior of the housing. The manually-operable push button means is responsive to the application of manually-applied pressure thereto for shifting the push button means to a second different and distinct position for releasing the lateral side edges of the tape strip and enabling it to automatically rewind back into the hollow interior of the housing.

In the preferred embodiment, the pair of opposing sides each has a generally teardrop-shaped configuration including a generally circular rear end portion and a tapered converging front end extending from the opposite sides of a diameter of the circular rear end toward one another to converge about the slotted opening. The housing has a symmetrical axis defined by a plane passing through the center of the circular rear end and the converging end of the tapered front end with the diameter being taken perpendicular to the symmetrical axis through the center of the circular rear end.

The lateral edge portion interconnecting the opposite sides is generally shaped as a semicircular arc joining the circular rear end, and it includes a pair of tapering, relatively straight, planar, edge-defining members converging from the diameter of the rear circular end toward the front end of the tapered converging portion. The pair of planar lateral edge portions terminates at the tapered distal end for forming the slotted opening therebetween. Anchoring means are provided for prevent the tape strip from completely rewinding into the housing. A generally circular aperture is provided adjacent the front end of the tape and along the central axis of the tape strip for enabling the tape to be anchored or pinned down for distance-measuring purposes. A single fastening means is adapted to pass through the circular aperture and operatively engage an anchoring means for joining the opposites sides of the lateral edge portion together into an integral housing assembly.

The slope of the converging planar lateral edge portions each is such that the strip can be withdrawn from the slotted opening and used with either the upper or lower tapered planar surfaces placed flat on a particular aeronautical chart, depending upon which surface is calibrated for said chart.

A pair of laterally-aligned circular apertures are disposed in both of the opposing sides of the housing, and are operatively disposed in the tapered converging front end and on the symmetrical axis adjacent to and disposed a predetermined distance from the slotted opening for operatively positioning said manually-operable push button means at least partially therethrough.

The manually-operable push button means of the present invention includes an elongated cylindrical rod having a longitudinal central axis. One end of the rod includes a first cylindrical extension having a first diameter, the distal end portion of the first cylindrical extension being operably received through one of the pair of the laterally-aligned circular apertures and extending exteriorly thereof for serving as a manually-operable push button. Said elongated cylindrical rod further including a second oppositely disposed cylindrical extension having a second diameter, at least the distal end portion of the second cylindrical extension being operatively received through the other of the pair of laterally-aligned circular apertures for reciprocal movement therein. The elongated cylindrical rod further includes an elongated intermediate cylindrical portion operatively disposed between said opposing cylindrical extensions and coaxial therewith. The elongated intermediate central portion has a third diameter which is substantially greater than the first and second diameters.

Means are provided for forming a tape slot aperture through the diameter of the elongated intermediate cylindrical portion, and at least a portion of the base of the second lateral extension opposite the distal end portion thereof. The tape slot aperture is dimensioned to slidably receive the strip for bidirectional movement therethrough, and the width of the tape slot aperture is a predetermined amount greater than the lateral width of the strip and extends almost along the entire length of the elongated intermediate cylindrical portion.

A first cylindrical recess is operatively disposed in the interior wall of one side of the housing and adapted to receive a first collar means having a sleeve and a flange member. A second recess in the opposite side similarly is adapted to house a second collar means having a sleeve and a flange member. A spring is operatively mounted in one of the recesses for normally biasing the flanges to grip the lateral side edges of the tape to prevent it from rewinding back into the hollow interior of the housing. The application of manually-applied pressure to the push button causes the cylindrical rod to shift sideways, and one of the collars which is fixedly mounted to the side of the housing loses contact between the flange and the edge of the tape thereby allowing the tape to automatically rewind back into the hollow interior of the housing. Various means are provided for preventing the distal end portion of the front end of the tape strip from rewinding back into the hollow interior of the housing, and various types of spring means may be used for normally-biasing the cylindrical rod for edge-gripping purposes. The tape strip itself may be one long band of spring steel or may include a first length of spring steel anchored at one end to form the coil with an intermediate length metal band attached to the opposite band of the spring steel band and adapted to include the graduations thereon.

In the preferred embodiment of the present invention, one surface of the tape strip is adapted for use with a particular type of aeronautical chart, such as a conventional WAC chart, while the opposite surface is adapted for use with a second different and distinct type of aeronautical chart, such as a conventional SECTIONAL chart. While only one distance-measuring unit could be used, it is preferred that at least two, and preferably all three, of nautical miles (NM), statute miles (SM), and kilometers (KM) be included on each side of the tape.

This invention also contemplates the use of the teardropped-shaped housing of the tape measure apparatus of the present invention with any type of tape measure wherein it is desirable to use both surfaces of the tape for different purposes.

These and other objects and advantages of the present invention will be more fully understood after reading the detailed description of the preferred embodiment, the claims, and the drawings which are briefly described hereinbelow.

BRIEF DESCRIPTION OF THE DRAWINGS

FIG. 1 illustrates a prospective view of the tape measure-type apparatus of the present invention;

FIG. 2 represents a side view, partially in section, of the apparatus of FIG. 1;

FIG. 3 illustrates a sectional end view of the push button assembly means of the present invention taken along view lines 3—3 of FIG. 2;

FIG. 4 is a similar sectional end view of the push button assembly means of FIG. 3 with the push button in the depressed position;

FIG. 5 is a top view, partially broken away, illustrating the edge-gripping function of the push button assembly means of FIGS. 3 and 4 as taken along view lines 5—5 of FIG. 3;

FIG. 6 is a sectional view taken along view lines 6—6 of FIG. 4 showing the edge-gripping means of the present invention in the released position with the push button in;

FIG. 7 is an exploded prospective view of the push button assembly means of one embodiment of the apparatus of the present invention;

FIG. 8 is a perspective view of the preferred embodiment of the push button assembly means of the present invention showing a spring washer used to bias the rod;

FIG. 9 is a sectional side view taken along view lines 9—9 of FIG. 8;

FIG. 10 is a prospective view of the slotted opening and front end of the tape showing an alternate embodiment of the stop means shown in FIG. 1;

FIG. 11 is a prospective view illustrating the anchor post end connection of the spring steel tape strip coupled thereto for forming the coil within the hollow interior of the housing;

FIG. 12 is a side view of one half of the housing of the apparatus of FIG. 1;

FIG. 13 is a side view of the second half of the housing of the apparatus of FIG. 1;

FIG. 14 is a top plan view of one end portion of the top surface of the tape strip of the preferred embodiment of the present invention;

FIG. 15 is a top plan view of the opposite surface of the tape strip of FIG. 14;

FIG. 16 illustrates the use of the distance-measuring tape measure-type apparatus of the present invention used to measure the distance between a point "A" and a point "B" on an aeronautical chart; and FIG. 17 illustrates one way of using the distance measuring tape strip of FIG. 10 for finding the exact distance between point A and point B.

DETAILED DESCRIPTION OF THE PREFERRED EMBODIMENT

FIG. 1 shows a perspective view of the tape measure-type apparatus 11 of the present invention. The apparatus 11 is shown as including a case or housing 13 having a first half shell 15 and a second and opposite half shell 17. The first and second half shells 15 and 17 are joined together by any conventional means such as by a screw-type faster or the like to join along the connection seam 19 to form the complete housing 13 of the aparatus 11. The housing 13 includes a first side face or surface 21 of the first half shell 15 and a second opposite face or surface 23 of the second half shell 17. The surfaces 21 and 23 are joined along the seam 19 by a lateral rim or edge portion 25.

The housing 13 includes a rounded rear portion 27 contiguous with a tapered, converging front portion or triangular portion 38. The lateral rim or edge 25 forming one leg of the triangular front portion 38 includes a first or upper triangular leg 29 which is relatively flat and planar while the opposite side of the lateral rim or edge 25 includes a second or lower triangular leg 31 which is also generally flat and planar. The apex, tapered front end, or vertex 33 of the tapered converging front portion or triangular portion 38 is formed at the convergence of the first planar leg 29 and the second planar leg 31 and includes means for forming and inlet/outlet slot or tape strip opening or aperture 35. The rounded rear portion 27 includes a generally circular section 37 having a center and a diameter 39 of the circular rear portion 37 forms the base of the triangular front portion 38 from which the first and second planar legs 29 and 31, respectively, extend to the slot-forming vertex 35 at the distal tapered end 33.

A single, circular fastener-receiving aperture 41 is operatively disposed at the center of the circular portion 37 and on the central axis of the circular rear portion 37 and a first circular pin aperture 43 is operatively disposed through the surface 23 of the second half shell 17 of the apparatus 11 of the present invention. The housing 13 of the tape measure-type apparatus 11 of the present invention includes a longitudinal axis or axis of symmetry 45 which extends as a plane through the single circular fastener-receiving aperture 41 and then through the first circular pin aperture 43 and through the inlet/outlet aperture or tape strip opening 35 at the distal front end or vertex 33 of the housing 13.

An elongated tape strip 47 is normally housed within the hollow interior 71 of the housing 13, as hereinafter described with respect to FIGS. 1 and 2. The elongated tape strip 47 includes a front or first end portion 49 having a front distal end 51 which includes a tab member or stop means 53 to prevent the tape strip 47 from being rewound into a coil within the hollow interior 71 of the housing 13. The tab member 53 includes a relatively straight base portion 55 perpendicular with the longitudinal axis of the tape strip 47 and a rounded front end portion 57. Fasteners 59, such as rivets or the like, are used to secure the opposite sides of the base clamp portion 55 to the front distal end 51 of the elongated tape strip 47 in a sandwich-like manner. The rounded end portion 57 of the tab member 53 may include a circular aperture 61, and the base portion 55 includes a pair of laterally-disposed ears 63 whose rear edges form stop surfaces 65 for abutting the sides of the inlet/outlet slot 35 to prevent the tape strip 47 from being rewound completely into the hollow interior 71 of the case 13.

A generally circular tape aperture 67 is operatively disposed along the longitudinal axis of the tape strip 47 and is spaced a predetermined distance from the front distal end 51 of the elongated tape strip 47 for enabling the tape strip 47 to be anchored or pinned to a particular location on a chart for distance-measuring purposes. The elongated tape strip 47 also includes a first lateral side edge 68 and a second opposite lateral side edge 69.

It will be observed that the diameter 39 of the circular section 37 taken perpendicular to the symmetrical axis 45 forms the conjunction between the front end of the rounded rear portion 27 and the base of the triangular portion 38. The sides of the triangular portion 38 include the generally flat planar rim portions or legs 29 and 31, respectively which taper from the outer opposite ends of the diameter 39 to converge at the vertex 33 of the triangular portion 38 at the slot opening 35. The length of the leg portions 29 and 31 are equal, and the symmetrical axis 45 of the housing 13 bisects the triangle formed by the tapered converging front portion 38 of the housing 13.

FIG. 2 shows a partially-sectional side view taken toward the first surface 21 of the housing 13 and partially broken away to show the hollow interior 71 of the housing 13. Within the circular central portion 37 of the rounded rear portion 27 of the housing 13 is operatively disposed a coil 81 of the elongated tape strip 47 having a first or front end portion 49, a second or opposite end portion 75, and an elongated intermediate tape portion 73 therebetween. The tape strip 47 has its second or opposite end portion made from spring steel adapted to automatically rewind into a selfwinding circular coil 81 whose center is proximately coaxial with the center of the circular section 37. The distal rear end 78 of the second or opposite end portion 75 of the tape 47 is adapted to be anchored to post 77 along the center axis of the circular portion 37, and may be integral and contiguous with or connected to the elongated intermediate portion 73 of the tape strip 47 as at connection point 79. In the preferred embodiment of the present invention, the second end portion 75 of the tape strip 47 includes an arcuately curved spring steel band or strip which is self-biased to automatically rewind itself back into the coil 81, as conventionally known in the art. and both the first or front end portion and the elongated intermediate tape strip portion include a relatively flat non-biased substantially flat metal band or strip having opposite upper and lower tape surfaces.

FIG. 2 is also shown as including a generally cylindrical guide post 83 whose longitudinal axis is perpendicular to the plane of the side surfaces 21 and 23 and is adapted to have at least the elongated intermediate portion 73 of the tape strip 47 pass thereover for guiding the tape strip 47 toward the push button pin assembly means 89 and the inlet/outlet tape slot 35. Immediately adjacent and to the rear of the push button pin assembly means 89 are disposed a first or upper guide rib 85 and a second or lower guide rib 87. The guide ribs extend outwardly from the interior sides of the first and second legs 29 and 31, respectively, of the triangular portion 38 of the housing 13 and include rounded portions disposed adjacent one another for forming a narrow guide passage 88 therebetween for guiding at least the elongated intermediate portion 73 of the tape strip 75 to the push button pin assembly 89, as hereinafter described.

FIG. 2 also shows the front end portion 49 of the elongated tape strip 47 extending from the push button pin assembly means 89 and through the inlet/outlet slot 35 at the distal end portion 33 of the triangular section 38, and the distal front end 51 thereof connected to the tab member or stop means 53, as previously described.

FIG. 3 shows a sectional front view of the push button pin assembly means 89 of FIG. 2 taken along view lines 3—3 thereof. FIG. 3 shows the first circular pin aperture 43 in the second surface 23 of the housing 13 and a corresponding second circular pin aperture 91 operatively disposed in the first surface 21 of the housing 13. The first and second circular pin apertures 43 and 91 are coaxial with one another and extend laterally through the tapered front end portion 33 of the triangular portion 38 adjacent to and spaced a predetermined distance behind the inlet/outlet slot 35 along the axis of symmetry 45 of the housing 13.

The push button pin assembly means 89 of the present invention is shown as including a generally cylindrical rod 90 having a first end portion or extension 93, a second opposite push button end portion or extension 95 and an elongated cylindrical central portion 97 disposed between the first and second end portions or rod extensions 93 and 95, respectively.

A generally hollow, cylindrical, interior cavity 98 is formed between the two halves 15 and 17 of the housing 13 for operatively housing the push button pin assembly means 89 of the present invention. The elongated central cylindrical portion 97 includes an elongated, laterally oriented tape slot 99 passing through a diameter thereof. The interior-facing distal end portion of the second rod extension 95 of the cylindrical rod 90 comprises the push button surface 101 and is adapted to receive the manual application of pressure thereto for moving the rod assembly 90 laterally within the cylindrical cavity 98 between first and second operable positions. In the first position 140, the push button end portion 95 is extended laterally out of the aperture 91 such that the tape strip 47 has its opposite lateral edges or sides 68, 69 gripped or pinched inwardly for preventing it from rewinding itself into the coil 81 within the hollow interior 71 of the housing 13, as previously described. When pressure is applied to the push button surface 101 of the rod extension 95, it moves laterally inward into the hollow interior 71 of the housing 13 and shifts to a second position 141 (shown in FIG. 4) for releasing the opposite lateral side edges 68, 69 of the tape strip 47 and enabling the tape strip 47 to automatically rewind itself into a coil 81 within the hollow interior 71 of the housing 13.

The push button pin assembly means 89 of the present invention also includes a first collar 103 and a second oppositely disposed collar 105. The first and second collars 103 and 105 include first and second generally circular, annular flange portions 107 and 127, and elongated, substantially hollow, first and second sleeves 109 and 129, respectively, which are contiguous with the central channels 115, 131 through the annular flanges 107 and 105, respectively. The annular flanges 107 and 127 each include an interior-facing contact surface 111 and 133, respectively, and exterior-facing surfaces 113 and 135, respectively.

The hollow interior 115 of first sleeve 109 and the hollow portion of the first flange 107 are mounted within a first recess or cavity 117 of the first half shell portion 15 of the housing 13. The first recess 117 has an opened end facing the elongated cylindrical portion 97 and a closed recessed floor 119 at the opposite end. Biasing means such as a compression-type coil spring 121 is housed within the first recess 117 such that one face of the coil spring 121 is operatively disposed on the floor 119 of the recess 117 while the opposite end of the spring 121 is disposed in an abutting relationship against the interior surface 113 of the first annular flange 111. The spring 121 is normally extended to bias or urge the first moveable collar 113 against the annular outer end surface 100 of the elongated central cylinder or cylindrical portion 97 at the juncture of the cylindrical portion 97 with the first end portion or first extension 93 thereof. This is referred to hereinafter as the first or normal position 140 wherein the opposite pushbutton end 101 of the second extension 95 is extended its maximum distance through the second circular pin aperture 91 such that the opposite annular surfaces 100, 102 of the cylindrical portion 97 are gripped by the inner contact surfaces 113 and 133 of the first and second flanges 107 and 127, respectively. Since the elongated hollow slot 99 passes not only through a diameter of the central cylindrical portion 97, but also through at least a portion of the first extension 93, the lateral side edges 68, 69 of the tape strip 47 are gripped or pinched between said surfaces 111 and 133 to hold the tape strip 47 so that the length extended through the inlet/outlet slot 35 remains extended and the tape 47 is prevented from automatically rewinding itself into the circular coil 81 within the hollow interior 71 of the housing 13.

FIG. 3 also shows that the first and second halves 15 and 17 of the housing 13 include a first and second relatively solid interior side portions 123 and 125, respectively. The hollow cylindrical recess or cavity 98 which houses the push button pin assembly means 89 of the present invention is formed within the first and second solid interior side portions 123 and 125, respectively.

The second collar 105 includes a second annular flange portion 127 and a second hollow cylindrical sleeve 129. The hollow interior 91 of the second sleeve 129 is contiguous and coaxial with the central aperture in the second flange 127 so as to form a continuous passage therethrough. The second flange 127 includes an interior contact or gripping surface 133 and an exterior annular surface 135. The exterior surface 135 of the second flange 127 is fixedly attached to the base or floor 134 of the second recess or cavity 136, as shown by the junction or seam 137. Similarly, the exterior surface 138 of the second cylindrical sleeve 129 is attached to the interior surface, 131 of the second circular aperture or channel 91.

It will be seen that the second cylindrical rod extension 95 extends through the second circular aperture 91 to a first or out position 140 (as shown in FIG. 3) indicating that the push button 95 is normally outwardly extended and the tape strip 47 is locked normally against movement into or out of the housing. The distal outer surface 101 of the extension 95 is adapted to receive the manual application of pressure applied thereto for depressing the push button 95 inwardly, and thereby laterally moving the first extension 95, the cylindrical intermediate portion 97, and the first extension 93 along with the first or moveable collar 103 to compress the biasing spring 121 and shift the push button assembly 89 to the second or release position 141, as shown in FIG. 4.

FIG. 4 illustrates the push button pin assembly means 89 of FIG. 3 in the second release position or non-edge gripping 141 wherein manual pressure has been applied to the contact or push button surface 101 of the second extension 95, as indicated by the pressure direction arrow 139. It will be observed in FIG. 4 that the normally extended coiled biasing spring 121 has been compressed for enabling the first collar 103 to move laterally to the left while the second collar 105 remains stationary thereby releasing the lateral edges 68, 69 of the tape strip 47, and enabling the tape strip 47 to automatically rewind itself into the coil 81 within the hollow interior 71 of the housing 13, as previously described.

FIGS. 5 and 6 again show the push button pin assembly means 89 of FIGS. 3 and 4 sectioned through the diameter of the slot 99 to better show the tape strip 47 as it is gripped and released. In FIG. 5, the tape strip 47 is shown as having a first lateral side edge 145 and a second opposite lateral side edge 147. The normal extension of the spring 121 against the exterior surface 113 of the first flange 107 creates a displacement space 149 as the interior contact surface 111 of the flange 107 contacts the first lateral edge 145 of the tape strip 47 and pushes the tape strip 47 against the interior surface 133 of the second annular flange 127 of the second collar 105 to pinch or grip the edges of 145, 147 of the tape strip 47 therebetween, thereby holding the tape strip 47 and preventing it from automatically rewinding. The contact of the lateral edges or sides 145 and 147 of the tape strip 47 with the interior contact surfaces 111 and 133 of the first and second flanges 107 and 127, respectively, are indicated by the reference numbers 151 and 152, respectfully.

As previously indicated, when the coiled spring 121 is in its normally extended elongated or compressed position, as indicated by the arrow 157, since the first collar 103 is movable under the action of the spring 121, the end of the first sleeve 109 is withdrawn into the channel 155 and away from the first circular opening or aperture 43. Simultaneously, since the second collar 105 is fixedly attached to the solid portion 125 of the interior of the housing 13, the second extension or push button shaft 95 is fully extended to its maximum position out of the hollow interior 131 of the second sleeve 127 and through the second circular aperture 91. So long as the apparatus 89 is in this first position, the tape 47 remains stationary and the length of tape manually pulled therefrom is prevented from rewinding back into the hollow interior 71 of the housing 13. The directional arrows 153 show the direction of motion of the push button assembly 89, and hence the tape strip 47 passing through the slot 99 therein under the urging of the spring 121.

FIG. 6 shows the second or release position 141 wherein the manual application of force has been applied to the push button surface 101 of the second extension 95, as indicated by the pressure application arrow 139. As can be seen in FIG. 6, the second rod extension 95 moves (to the left) further into the second circular pin aperture 91 and into the hollow interior 131 of the second sleeve 129. Since the second collar 105 is fixedly attached to the solid portion 125 of the housing 13, the contact face or surface 133 of the second flange 129 no longer contacts the second lateral side edge 147 of the tape strip 47. Since the first collar 103 moves laterally, as shown by the directional arrow 161 with the motion of the rod assembly 90, comprising the first extension 93, the second extension 95, and the elongated cylindrical portion 97 therebetween, the spring 121 is compressed, as indicated by reference number 158, the displacement space 149 and 151 appears when the tape strip edge 147 disengages the contact surface 111 of the first flange 107 from contact with the first lateral side edge 147 of the tape strip 47, thereby releasing the tape strip 47 for movement in the direction shown by the arrow 159 and permitting it to automatically rewind itself into the circular coil 81 within the hollow interior 71 of the housing 13, as previously described.

FIG. 7 shows an exploded view of the push button pin assembly means 89 of the present invention and includes the push button pin assembly or rod 90 having the first elongated cylindrical intermediate portion 97 with the first cylindrical end extension 93 and the second lateral oppositely disposed end extension 95. The coil spring 121 is shown as being able to have its central hollow core portion 160 fitted over the peripheral exterior surface 111 of the first cylindrical collar sleeve 109 to abut against the exterior contact surface 113 of the first annular collar flange 107 whose opposite contact surface 111 faces a first annular side 163 of the elongated intermediate cylindrical portion 97. The intermediate cylindrical portion 97 is shown as including the elongated slot 99 through which the tape strip 47 passes. The opposite annular surface 165 of the intermediate cylindrical portion 97 is movable with respect to the interior contact surface 133 of the second collar flange 127 of the second collar 105, as previously described. Similarly, the second extension 95 is shown as extending through the hollow interior 131 of the fixedly positioned collar sleeve 129 and out of the second circular aperture 91 so that the contact surface 101 is exposed for use.

FIG. 8 shows the preferred embodiment of the push button pin assembly 89 of the present invention. In FIG. 8, the push button assembly or cylindrical rod is represented by reference numeral 235. The rod 235 includes the first cylindrical extension 93 having a distal end 245; the opposite or second cylindrical extension 95 containing the push button surface 101 at the distal end thereof; and the elongated intermediate cylindrical portion 97 therebetween and having a greater diameter. As shown in FIG. 8, the elongated slot 99 extends completex through a diameter of the intermediate cylindrical portion 97 and the slot 99 includes a first slot extension 237 which extends predetermined distance into the diameter of the base 239 of the first extension 93 and a second or opposite slot extension 238 which extends a predetermined distance into a corresponding diameter of the base 240 of the opposite second end extension 95. The intermediate cylindrical portion 97 is shown as including a first annular side face 241 where the base 239 of the first extension 93 is integral with the intermediate portion 97 and an opposite annular side surface 243 wherein the base 240 of the second extension 95 is integral with the elongated intermediate cylindrical portion 97.

In the embodiment of FIG. 8, the coil spring 121 has been replaced by a baffled spring washer 247 having an arcuately curved body portion 249 and a central aperture 251 adapted to receive the first extension 93 therethrough such that one surface 250 abuts the annular surface 241 of the intermediate cylindrical portion 97 while the opposite surface 252 or at least the edges thereof abuts the base or floor 119 of the first cavity or recess 117, as previously disclosed.

FIG. 9 shows a sectional view taken through view lines 9—9 of FIG. 8. In FIG. 9, the slot 99 is shown through a diameter of the rod assembly 235, and it is clearly seen as extending through the base portion 239 of the first extension 93 as indicated by the slot extension 237 and through the base portion 240 of the second opposite end extension 95 as indicated by the slot extension 238. Furthermore, the distal or exterior-facing surface 245 of the first extension 93, which slides laterally back and forth through the channel 155 and the first circular aperture 43, is shown, as are the first and second annular sides 241 and 243, respectively, of the elongated intermediate cylindrical portion 97.

FIG. 10 illustrates an alternate embodiment of the stop means 53 of FIGS. 1 and 2. In FIG. 10, the tapered converging front end portion 38 and the vertex 33 thereof forms the inlet/outlet tape strip slot 35. The tape strip 47, or at least the first or front end portion 49 thereof extends through the slot 35 to the exterior of the housing 13. The first end portion 49 of the tape strip 47 is shown as having its distal end 51 sandwiched between opposing rectangular bases 253 of the stop means 53 and the bases 253 are fixedly secured to the distal end portion 51 of the front end portion 49 of the tape strip 47 as by conventional fasteners such as rivets or pins 255. The forward end of the opposing plates 253 include a hollow cylindrical portion 257 having a hollow interior 270 adapted to receive one leg 261 of a rectangular loop 259 through the hollow interior 270. The loop 259 includes a first elongated leg 261 and an opposite elongated leg 263. The legs 261 and 263 are joined by a pair of lateral legs 265 and 267 to form the generally rectangular loop 259. The loop 259 has a hollow interior 269, and the rear-facing distal edge portions 271 of the first leg 261 form contact or stop surfaces 271 which abut the sides of the housing 13 at the vertex and 33 thereof and prevent the front end portion 49 of the tape strip 47 from being withdrawn completely into the hollow interior of the case or housing 13.

FIG. 11 shows the anchor pin assembly 275 of the preferred embodiment of the present invention. Pin 275 is connected to or integral with the interior side surface 273 of the first half shell 15 at its base end 287. Preferably, a threaded bore or channel 277 which passes through the opposite end 278 of the pin 275 forms the center of the circular section 37 of the rounded rear portion 27 of the housing 13, as previously described. The threaded aperture 277 is adapted to engageably receive a conventional threaded fastener (not shown, but known in the art) which passes through the single connection aperture 41 of FIG. 1 and screws into the threaded channel 277 of the cylindrical post 275. The post 275 also includes an off-center chord or longitudinal slot 279 passing through the free end and extending 278 nearly to the base 287. This slot 279 is adapted to receive the distal end portion 285 of the second end portion 75 of the tape strip 47 for anchoring the end of the spring steel portion 75 of the tape strip 47 such that it forms the circular coil 81 about the post 275 as indicated by the directional arrow 289. The second end portion 75 of the tape strip 47 is shown as including an end portion 281 which is bent back upon itself in a generally U-shaped channel having a curved portion 283 and a distal end portion 285 substantially parallel to the plane of the end portion 281. The portion 285 is adapted to be slidably received within the slot 279 for anchoring or removably securing the tape strip 47 thereto.

FIGS. 12 and 13 show the hollow interior of each of the halfs 15 and 17 of the housing 13 of FIG. 1. FIG. 12 illustrates the first half shell 17 while FIG. 13 represents the second half shell 15. The first half shell 17 of FIG. 12 is shown as including a lateral side 23 having an interior surface 280 forming the bottom or base of the hollow interior 38 thereof. The sides of the hollow interior 71 are bounded by the outer rim portion 29 which is shown as including, in the preferred embodiment of the present invention, a raised exterior peripheral lip 295 and a lower interior ridge or step portion 297 such that the height that the intermediate step portion 297 is spaced a shorter distance from the interior plane 280 than is the parallel surface of the raised rim portion 295. The raised peripheral lip portion 295 forms the relatively flat triangular leg surface or side 291 about the triangular portion or tapered converging end portion 38 of the housing 13, as previously described. A similar relatively flat opposite surface 293 forms the second triangular side or leg and the sides 291 and 293 are shown as converging toward the vertex 33 to form the inlet/outlet slot 35 between the outer peripheral lip or mouth portions 305.

The side 23 is shown as including a central circular fastening aperture 41 which is surrounded by an annular raised lip, rim, or reinforcement portion 309 raised above an annular base 307 of the surface 280 of the side 23. An oval-shaped raised portion 311 then surrounds the circular annular portion 309.

The tapered converging front end portion 38 is also shown as including a guide pin aperture 303, slightly off of the symmetrical center axis formed between the circular fastener aperture 41 and the center of the inlet/outlet mouth or slot opening 35, while the push button aperture 91 is disposed a predetermined distance between the guide post aperture 303 and the inlet/outlet aperture 35 but is disposed along the symmetrical center line or axis of symmetry drawn between the center of the circular fastener aperture 41 and the center 402 of the inlet/outlet 35.

It will be observed that a diagonal 401 passing through the aperture 41 representing the center 402 of the circular or rounded rear portion 27 to bisect the circular portion the rounded end 37 of the housing forms the base of the triangular portion 38 including the legs 291 and 293 which converge on the apex 33 and the inlet/outlet 35 such that the axis of longitudinal symmetry 403 bisects the angle between the legs 291 and 293.

FIG. 13 shows a similar structure for the opposite half shell 15 including the raised peripheral lip 313 and the lower interior ridge 315. FIG. 13 shows the interior surface 281 as including the pin or post 275 having the threaded aperture 277 longitudinally therethrough and the longitudinal end-engaging slot 279. The tape strip 47 is shown in phantom lines as forming the circular coil 81 within the hollow interior 71 of the housing 13, as previously described. It will be seen that the push button pin assembly 89 is illustrated as it would be positioned in phantom lines while the second circular pin aperture 131 is shown. The tape strip 47 is shown in phantom lines as extending through the inlet/outlet opening 35 and it will be seen that the tape strip 47 passes about a single cylindrical guide post 310 to be guided through the push button pin assembly 89, as previously described.

FIGS. 14 and 15 show the opposite surfaces of the first or front end portion 49 of the tape strip 47 of the preferred embodiment of the present invention. In FIG. 14, the front end portion 49 of the tape strip 47 is shown as having its first or upper surface 168 including a chart designator indicia means 167 to indicate that tape surface 168 is and the scales and graduations thereon are to be used with a conventional aeronautical chart defined as a conventional "World Aeronautical Chart" or "WAC" chart. The first or upper surface 168 of the tape strip 47, or at least the first elongated end portion 49 thereof, is shown as including a first scale or set of graduations 169, a second scale or set of graduations 171, and a third scale or set of graduations 173. The first scale 169 is graduated in units as shown by the reference numeral 175; the second scale 171 is graduated in units as represented by the reference numeral 177; and the third scale 173 is graduated in units as indicated by the reference numeral 179. The major portion of the first, second and third scales 169, 171, and 173, respectively are also graduated in tens units as indicated by the tens units 181, 183, and 185, respectfully. Each of these scales include designator indicia to inform the user as to what increments the various units and tens graduations mean on the particular aeronautical chart to which that surface of the tape is calibrated. The first scale 169 includes a first scale designator indica 187 indicating that the first scale 169 is to be used to measure nautical miles or "NM"; the second scale 171 includes the second scale designator indica 189 which indicates that it measures in statute miles or "SM"; and the third scale 173 includes a third scale designator indicia 191 which indicates that the third scale 173 is to be read in kilometers (KM).

FIG. 14 also shows the tab member 53 as including the rounded portion 57 having the aperture 67 therethrough and the base portion 55 which is secured to the distal end portion 51 of the front end portion 49 of the tape strip 47 via fasteners or rivets 59. The base 55 of the tab member 53 includes a pair of laterally extending ears 63 which are generally coplanar with the plane of the rounded portion 57 and extend perpendicularly from the elongated axis of the tape strip 47. Each of the ears 63 is shown as having an abutment, contact or stop surface 65 for abutting the sides of the inlet/outlet slot 35 and preventing the tape 47 from rewinding back into the housing 13, as previously described.

FIG. 15 shows the opposite side or bottom surface 193 of the front end portion 49 of the tape strip 47 of the present invention. The surface 193 is shown as including a second chart designator indicia 195 which, in the preferred embodiment of FIG. 15, indicates that the surface 193 and the various scales contained thereon are to be used with a conventional "Sectional Aeronautical Chart" or "SECT". The bottom surface 191 includes a first distance measuring scale 197, a second distance measuring scale 199, and a third distance measuring scale 201. The first scale 197 includes unit graduations 203, the second scale 199 includes unit graduations 205 and the third distance measuring scale 201 includes a third set of unit graduations 207. The first scale 197 also includes tens graduations 209; the second scale 199 includes tens graduations 211; and the third scale 201 includes a third set of tens graduations 213. Furthermore, each of the first, second and third scales 197, 199, and 201, include first, second, and third scale identification indica 215, 217, and 219, respectively, for indicating that they are to be read in Nautical Miles (NM), Statute Miles (SM), and Kilometers (KM), respectively.

FIGS. 16 and 17 are used to illustrate one way of using the airman's tape measure-type apparatus 11 of the present invention. In FIG. 16, the zero line 221 which passes through the aperture 67 is placed abeam or immediately adjacent to and aligned with a point of departure or point "A", as represented by the circle 223. Assuming that the pilot or navigator has to measure the distance between point "A" 223 and a point "B", or destination point 225, the use of the tape measure apparatus 11 of the present invention will now be described.

If the zero index line 227 is placed immediately abeam or adjacent to point "A", represented by the circle bearing the reference numeral 223, the tape 47 is stretched out by manually grasping the tab member 53 and physically pulling it from the interior of the housing 13. As soon as a portion of the tape 47 lies beyond point "A", the tape 47 can be released and the edges are gripped by the push button assembly means 89, 95 previously described, to prevent it from automatically rewinding back into the housing. It will be observed that point "B" falls a short distance from the tens graduation 181 on the first or nautical mile scale 169 reading 80 NM. In order to read the units accurately, the tape is shifted along the surface 400 of the map or chart over which it is disposed until the nearest tens increment (80) passes through the line 231 which passes through point "B" 225. In this case, the tape is moved forward or to the left as shown in FIGS. 16 and 17 until the "80" tens graduation is on the index line 231 passing through point "B". With this done, we know that if we move the scale to the left, we increased the indication to the next higher tens unit 80, so that the amount shown on the unit scale must be substracted. Since the line 227 now passing through point "A", as represented by the circle 223, with the line 227 always taken perpendicular to the longitudinal central axis of the tape strip 47, we can see that it reads one unit as indicated by reference numeral 233. Therefore, we subtract one unit from the tens increment 80 and read 79 nautical miles between point "A" and point "B". It will, of course, be obvious that we could have moved the tape to the right until point "B" was adjacent the 70 graduation in which case we would have added nine units from the first units scales 175, as previously described.

It will also be observed, that when a rather long length of tape 47 is used, once the tape is initially positioned, as shown in FIG. 16, a pin maptack or similar member can be placed through the aperture 67 to anchor or hold it in place until the pilot is ready to move it for units scale adjustment. The direction in which the tape was moved between FIGS. 16 and 17 is indicated by the directional arrow 229 since it must be understood that points "A" and "B" remain stationary on the underlying chart.

It will be obvious to those of ordinary skill in the art that many alterations are inherent in the invention, as described. It will be obvious that the tape strip may include a continuous spring steel band from start to finish or may have a spring steel rear portion and a completely flat front end portion which includes the scales or graduations. Similarly, various types of tab means or stop members could be used, and the pin or anchoring aperture on the tape could be placed anywhere along the distal front end portion. Furthermore, while the diameters of the first and second extensions are substantially less than the diameter of the cylindrical portion, the diameters can change with respect to one another so long as the diameter of the cylindrical portion is greater than that of the extensions. Various types of fasteners can be used for securing the tab members, for holding the case together, for anchoring the end of the tape strip within the hollow interior of the housing, etc. Different shapes and types of biasing springs can be used, and various types of push buttons could be used to actuate the movement of the second extension. The elongated slot has to be at least as long or slightly longer than the length of the intermediate cylinder as shown in the preferred embodiment and the earlier-described alternate embodiment.

While the drawings are meant to show a slight extension of the slot into the first extension in FIGS. 3 and 4, the drawings are shown more accurately, if not slightly exaggerated, thereinafter. It will also be understood that the tape measure of the present invention could be used anywhere the opposite surfaces of the tape are desired to be used with different charts or for completely different purposes, and wherein each is to contain one or more scales or successive graduations on each side, depending upon the use to which that side is to be put. The teardrop-shape of the housing of the present invention and the flat triangular leg surfaces enables the tape measure to be laid flat on any given flat surface, and the tape to be drawn out upside-down or right-side-up depending upon which surface the user wishes to observe and use for that particular purpose.

It will obvious to those skilled in the art that various modifications, changes, alterations, substitutions, and the like may be made in the preferred embodiment of the present invention without departing from the spirit and scope thereof which is limited only by the appended claims.

What is claimed is:

1. A distance-measuring navigational aid apparatus comprising:
    a housing having a pair of opposing parallel sides, a single unbroken continuous lateral edge portion interconnecting said sides to form a hollow interior therebetween and a slotted opening through one section of said lateral edge portion:
    an elongated, relatively thin relative narrow strip of spring steel having a front end portion, a rear end portion, an intermediate portion operably disposed between said end portions, a top surface, and a bottom surface, said elongated strip being self-biased to automatically wind itself into a coil within the hollow interior of said housing, said front end portion extending at least partially through said slotted opening and including stop means for preventing said strip from rewinding completely into the hollow interior of said housing, said stop means being generally coplanar with the plane of said strip for enabling either of said opposing parallel sides of said strip to be laid flat on a chart surface:
  graduation means including a plurality of distance-measuring scales operably disposed on each surface of at least the elongated intermediate portion of said strip, said graduation means operably disposed on said top surface of at least the elongated intermediate portion of said strip being calibrated for a first predetermined type of aeronautical chart having a first distance scale and said graduation means operably disposed on said bottom surface of at least the elongated intermediate portion of said strip being calibrated for a second aeronautical chart having a second different and distinct distance scale; and
  manually-operable push button means being normally biased in a first position for gripping the lateral side edges of said strip and locking same against rewinding back into the hollow interior of said housing, said manually-operable push button means being responsive to the application of manually-applied pressure thereto for shifting said push button means to a second different and distinct position for releasing the lateral side edges of said strip and enabling it to automatically rewind back into the hollow interior of said housing, said push button means being responsive to the outwardly-directed application of manually-applied pulling force to said front end portion of said strip for enabling said strip to be pulled a predetermined desired distance out of said hollow interior of said housing regardless of the position of said push button means.

2. The distance-measuring navigational aid apparatus of claim 1 wherein said housing further comprises:
  said pair of opposing sides each having a generally teardrop-shaped configuration including a generally circular rear end portion and a tapered converging front end portion extending from opposite sides of a diameter of said circular rear end portion toward one another and terminating adjacent said slotted opening;
  said housing having a symmetrical axis defined by a plane passing through the center of said circular rear end portion and the converging end of said tapered front end portion, said diameter being taken perpendicular to said symmetrical axis through the center of said circular rear end portion;
  said lateral edge portion interconnecting said opposing sides being generally shaped as a semicircular arc joining said circular rear end portion and including a pair of tapering, relatively straight, planar, edge-defining members converging from said diameter of said rear circular end portion toward said tapered converging front end portion:
  said pair of tapering planar lateral edge portions terminating at said distal end of said tapered front end portion for forming said slotted opening therebetween, said pair of tapering planar lateral edge portions forming an acute angle therebetween as measured at said slotted opening;
  anchoring means operably disposed on the interior-facing surface of one of said opposing sides and coaxial with the axes of said circular rear end for securing at least the distal end of said rear end portion of said strip thereto for enabling said strip to automatically form a generally circular coil thereabout;
  a generally circular aperture through the other of said pair of opposing sides of said housing along said central axis of said circular rear end portion for communicating with said anchoring means;
  a single fastening means adapted to pass through said circular aperture and operatively engage said anchoring means for joining said opposing sides and said lateral edge portions together into an integral housing;
  the slope of said converging planar lateral edge portions each being such that the strip can be withdrawn from said slotted opening and used with either of the upper and lower tapered planar surfaces placed flat on the particular aeronautical chart in use, depending on which of said surfaces is calibrated therefore; and
  a pair of laterally-aligned circular apertures in both of said opposing sides of said housing operatively disposed in said tapered converging front end and disposed on said symmetrical axis and adjacent to and disposed a predetermined distance from said slotted opening for operatively positioning said manually-operable push button means at least partially therethrough.

3. The distance-measuring navigational aid apparatus of claim 2 wherein said manually-operable push button means further comprises:
  an elongated cylindrical rod having a longitudinal central axis, one end of said rod including a first cylindrical extension having a first diameter, the distal end portion of said first cylindrical extension being operatively received through one of said pair of laterally-aligned circular apertures and extending exteriorly thereof for serving as a manually-operable push button, said elongated cylindrical rod further including a second oppositely disposed second cylindrical extension having a second diameter, at least the distal end portion of second cylindrical extension being operably received through the other of said pair of laterally-aligned circular apertures for reciprocal movement therein, said elongated cylindrical rod further including an elongated intermediate cylindrical portion operatively disposed between said opposing cylindrical extensions and coaxial therewith, said elongated intermediate cylindrical portion having a third diameter which is substantially greater than said first and second diameters:
  means for forming an elongated slot aperture through a diameter of said elongated intermediate cylindrical portion and at least a portion of the base of said second lateral extension opposite said distal end portion thereof, said tape slot aperture being dimensioned to slidably receive said strip for bidirectional movement therethrough, the width of said tape slot aperture being a predetermined amount greater than the lateral width of said strip and extending substantially along the entire length of said elongated intermediate cylindrical portion whose length is less than the width of the hollow interior of said housing:
  a first cylindrical recess operatively disposed in the interior wall of said one side of said housing, said first recess having a diameter adapted to receive one end portion of said elongated intermediate cylindrical portion of said rod for reciprocal movement therein, said one of said pair of laterally-aligned circular apertures communicating with the central bottom portion of said first cylindrical recess and said laterally-aligned circular aperture having a diameter less than the diameter of said first recess and being coaxial therewith:

a second cylindrical recess operatively disposed in the interior wall of said opposite side of said housing, said second cylindrical recess having a diameter adapted to receive the opposite end portion of said elongated intermediate cylindrical portion of said rod for reciprocal movement therein, said opposite one of said pair of laterally-aligned circular apertures communicating with the central bottom portion of said second cylindrical recess and said opposite laterally-aligned circular aperture having a diameter less than the diameter of said second recess and being coaxial therewith:

a first collar means including a first generally hollow cylindrical sleeve and a first annular flange having a central aperture therethrough, the diameter of said first annular flange being substantially greater than the diameter of said first hollow sleeve, one end of said first hollow sleeve being integral with a central portion of said first flange such that said first central flange aperture and the hollow interior of said first sleeve are similarly dimensioned and coaxial with one another, said first annular flange having an exterior surface disposed in the direction of said first cylindrical sleeve and an opposite interior surface facing the hollow interior of said housing, said first collar means being fixedly secured to said first side of said housing with said first sleeve secured within said first one of said pair of laterally-aligned circular apertures and the exterior surface of said first annular flange being operatively secured to the bottom of said first recess for reciprocally receiving said first cylindrical extension through said first central flange aperture and the hollow interior of said first sleeve:

a second collar means including a second generally hollow cylindrical sleeve and a second annular flange having a central aperture therethrough, the diameter of said second annular flange being substantially greater than the diameter of said second hollow sleeve, one end of said second sleeve being integral with a central portion of said second flange such that said second central flange aperture and the hollow interior of said second cylindrical sleeve are similarly dimensioned and coaxial with one another, said second annular flange having an exterior surface disposed facing in the direction of said second cylindrical sleeve and an opposite interior surface facing the hollow interior of said housing, said second collar means slidably mounted for reciprocal motion within said second recess of said opposite side of said housing, said second opposite cylindrical extension being slidably disposed through said second central flange aperture and through the hollow interior of said second sleeve, the interior surface of said second annular flange abutting the opposite end of said elongated intermediate portion of said rod for reciprocal movement therewith, at least one end portion of said second cylindrical extension being adapted to be reciprocally received through said second central flange aperture, through the hollow interior of said second sleeve, and through said opposite one of said pair of laterally-aligned circular apertures; and spring means operatively disposed within said second cylindrical recess for normally biasing said second collar means inwardly toward the hollow interior of said housing such that said interior surface of said second annular flange abuts the opposite end of said elongated intermediate cylindrical portion of said rod for gripping the opposite lateral side edges of said strip passing through said tape slot between the interior surface of said second annular flange and the interior surface of said first annular flange to lock said strip against motion in and out of said slotted aperture of said housing, said first cylindrical extension being responsive to the manual application of pressure to the distal end thereof for extending through said first one of said pair of laterally-aligned circular apertures for shifting said rod in the direction of said second opposite one of said pair of laterally-aligned circular apertures for disengaging at least one lateral side edge of said strip from contact with the interior surface of said first annular flange for unlocking said strip and enabling it to automatically rewind itself back into the hollow interior of said housing for forming said coil therein.

4. The distance-measuring navigational aid apparatus of claim 3 wherein said first predetermined type of aeronautical chart is a conventional WAC chart and said second predetermined type of aeronautical chart is a conventional SECTIONAL chart.

5. The distance-measuring navigational aid apparatus of claim 2 wherein said rear end portion of said strip includes an accurately curved spring metal band having one end operatively coupled to the intermediate portion of said strip and the opposite end secured to said anchoring means.

6. The distance-measuring navigational aid apparatus of claim 5 wherein said anchoring means includes a generally cylindrical post having a threaded hollow central bore, said bore open at one end and attached at the opposite closed end thereof to one side of said housing, a central connector aperture operatively disposed in the circular portion of said opposite side of said housing and aligned with the axis thereof, said anchoring means including a screw-type fastener means adapted to be passed through said central connector aperture of said opposite side of said housing for securing the two halves of said housing together.

7. The distance-measuring navigational aid apparatus of claim 3 wherein said biasing means includes a cylindrically shaped, generally hollow, circular spring member operatively housed within the hollow interior of said second recess and having said second sleeve passing therethrough such that one end of said spring abuts the bottom of said second recess and the opposite end of said spring abuts said exterior surface of said second annular flange for a normally biasing said second collar means inwardly for gripping the lateral side edges of said strip, said spring member being compressed by the manual application of pressure to the distal end of said first cylindrical extension for releasing the opposite lateral side edge of said strip from contact with the interior surface of said first annular flange to unlock and enable said strip to rewind itself back into the hollow interior of said housing for forming said coil therein.

8. The distance-measuring navigational aid apparatus of claim 3 wherein said biasing means includes a curved buckled metal spring washer member operatively housed within the hollow interior of said second recess for normally biasing said second collar means inwardly for gripping the lateral side edges of said strip and locking same against movement, said spring member being compressed by the manual application of pressure to the distal end of said first cylindrical extension for disengaging the opposite lateral side edges of said strip from contact with the interior surface of said first annular flange to unlock and enable said strip to rewind itself back into the hollow interior of said housing to form said coil therein.

9. The distance-measuring navigation aid apparatus of claim 1 wherein said means for preventing said strip from rewinding itself completely back up into the hollow interior of said housing includes a pair of laterally extending tab members operatively secured adjacent the distal front end of said front end portion of said strip, said tab members being symmetrical with the longitudinal axis of said strip and extending in opposite lateral directions therefrom, and the plane of each of said tab members being generally coplanar with the plane of said strip and with one another.

10. The distance-measuring navigational aid apparatus of claim 1 wherein said means for preventing said strip from rewinding itself completely into the hollow interior of said housing includes a generally rectangular loop, a generally hollow cylindrical member adapted to retainably receive one side of said generally rectangular loop therein for suspending same for pivotal motion above the longitudinal axis of said hollow cylindrical member, means for fixedly securing the distal front end of said front end portion of said strip to said hollow cylindrical member said loop being responsive to said pivotal motion for being operably disposed flat on the said chart regardless of which side of said strip is facing upward.

11. The distance-measuring navigational aid apparatus of claim 1 wherein said first predetermined type of aeronautical chart is a conventional WAC chart and said second predetermined type of aeronautical chart is a conventional SECTIONAL chart.

12. An airman's navigational aid for enabling said airman to measure distances in a plurality of different and distinct distance units and for two different and distinct types of aeronautical charts, each of which has a basically different distance scale, comprising:

a generally teardrop-shaped housing having a pair of oppositely disposed, spaced apart, teardrop-shaped sides and a lateral rim portion connecting said sides to form a hollow interior therebetween, the planes of said sides being substantially parallel to one another and perpendicular to the plane of said lateral rim, said housing having a first generally rounded circular portion and a generally tapered converging portion, said housing further including a slotted aperture at the narrowest converging end of said tapered converging portion;

a relatively thin, narrow, elongated tape strip comprising spring steel, said tape strip including a front end portion, a rear end portion, and an elongated intermediate portion operatively disposed between said end portions, said tape strip including means for operatively disposing the distal end of said rear end portion centrally within the hollow interior of the rounded circular portion of said housing for anchoring same, and further including means for normally urging at least said intermediate portion and said rear end portion to automatically rewind itself up about said anchoring means into a generally circular coil, at least the distal end of said front end portion being adapted to pass out of the hollow interior of the generally tapered converging portion of said teardrop-shaped housing through said slotted aperture, said slotted aperture having a width substantially equal to the width of said lateral rim and slightly greater than the width of said tape strip for enabling said tape strip to pass bidirectionally therethrough, at least the elongated intermediate portion of said tape strip having upper and lower surfaces which are parallel to one another, the distal end of said front end portion passing out of said slotted aperture including means for preventing same from being automatically rewound into said coil within the hollow interior of said housing;

graduation means operatively disposed on each of said upper and lower surfaces of at least said intermediate portion of said tape strip for measuring distances in any one of nautical miles, statute miles, and kilometers, said upper surface of at least said intermediate portion of said tape strip being adapted for use with a first type of aeronautical chart having a first scale and said lower surface of at least said intermediate portion of said tape strip being adapted for use with a second different and distinct aeronautical chart having a second different and distinct scale;

a manually-operable push button assembly means operatively disposed in said tapered converging portion of said housing and located a predetermined distance from said slotted aperture and on the centerline of said housing extending between said slotted aperture and the center of said rounded circular portion of said housing, said push button assembly means normally gripping the opposite side edges of said tape strip when any desired length of said intermediate portion thereof has been unwound and withdrawn through said slotted aperture and for locking the tape strip in a given position and preventing it from automatically rewinding back into said coil within the hollow interior of said rounded circular portion of said housing, said push button assembly means being responsive to the manual application of pressure thereto for releasing the side edges of said gripped tape strip for enabling it to be automatically drawn in through said slotted aperture and rewound into said coil within the hollow interior of the rounded circular portion of said housing.

13. The airman's navigational aid of claim 12 wherein said first aeronautical chart is a conventional WAC chart and wherein said second aeronautical chart is a conventional SECTIONAL chart.

14. The airman's navigational aid of claim 12 wherein said tape strip includes a longitudinal central axis and wherein said front end portion of said tape strip includes a circular aperture means operatively disposed along said central axis for enabling the user to place said circular aperture over a predetermined location on said aeronautical chart and for anchoring said tape 15. The airman's navigational aid of claim 12 wherein said means for preventing the distal end of said front end portion of said tape strip from being automatically pulled through said slotted aperture and into the hollow interior of said tapered converging portion of said housing includes tab means, said tab means including a pair of oppositely disposed ear members, one of said ear members being operatively disposed on each lateral side of said tape strip, the planes of said ear members being generally parallel to one another and generally coplanar with the plane of said tape strip, both of said ear members extending outwardly in opposite directions from the side edges of said tape strip and being oriented symmetrically with respect to the longitudinal axis of said tape strip said ear members having rear stop surfaces adapted to abut the lateral sides of said slotted aperture for preventing said front end portion of said tape strip from passing into said slotted aperture.

16. The airman's navigational aid of claim 12 wherein the interior of said tapered converging portion of said housing includes a pair of generally rounded tape strip guide means operatively disposed inwardly from the interior surface of said lateral rims adjacent to and spaced a predetermined distance from said slotted aperture for guiding said tape strip from said edge-gripping means through said slotted aperture.

17. The airman's navigational aid of claim 12 wherein the interior of said tapered converging portion of said housing includes a single cylindrical tape strip guide means operatively disposed therein and located a predetermined distance off of said longitudinal axis for guiding said tape strip from said edge-gripping means through said slotted aperture.

18. The airman's navigational aid of claim 12 wherein said push button assembly means further comprises:
   an elongated, generally cylindrical rod having a first end portion having a first diameter, a second opposite end portion having a second diameter, and an intermediate cylindrical portion therebetween, said intermediate portion having a third diameter, said third diameter being greater than said first and second diameters, each of said portions of said rod being coaxial with one another;
   said intermediate portion and at least a portion of said first end portions of said generally cylindrical rod including an elongated aperture slit means disposed diametrically and centrally therethrough such that the lateral axis of said aperture slit means passes through the central axis of said intermediate cylindrical portion, said aperture slit means being operably sized for receiving said tape strip for bidirectional movement therethrough and for slight side-to-side lateral movement therein;
   a first collar means including a substantially hollow cylindrical sleeve portion for operatively receiving said one end portion of said rod therethrough and a first annular flange portion at the interior end of said first sleeve portion having an annular contact surface for engaging one lateral side edge of said tape strip;
   a first generally cylindrical recess means having a diameter slightly greater than the diameter of said intermediate cylindrical portion for operatively receiving said sleeve portion for lateral movement therein;
   a first generally circular aperture through one teardrop-shaped side of said housing for operatively receiving at least the outer end portion of said one end portion of said rod and said sleeve portion housing same for reciprocal movement therein;
   said first circular aperture and first cylindrical recess being coaxial and said first circular aperture communicating with the central portion of the floor of said first cylindrical recess;
   a second collar means including a substantially hollow second sleeve portion for operatively receiving said second opposite end portion of said rod means for lateral movement therein, and a second annular flange portion at the interior end of said second sleeve portion and having an annular contact surface for engaging the opposite one of said lateral side edges of said tape strip;
   a second generally cylindrical recess means having a diameter slightly greater than the diameter of said intermediate cylindrical portion of said rod for operatively receiving said fixedly positioned second sleeve portion therein;
   spring means operatively disposed within said first cylindrical recess for normally urging said first annular flange portion against one lateral side edge of said tape strip for laterally moving said rod laterally sideways along the longitudinal axis thereof such at the opposite side edge of said tape strip abuts the interior-facing surface of said fixedly positioned second annular flange for gripping the opposite lateral side edge of said tape strip and locking same therebetween to prevent its rewinding itself back through said slotted aperture and said aperture slit means into said coil within the hollow interior of the rounded circular portion of said housing;
   a second generally cylindrical aperture through the opposite teardropped-shaped side of said housing for operatively receiving at least the outer end portion of said second opposite end portion of said cylindrical rod for reciprocal movement therein;
   said intermediate cylindrical portion of said rod being positioned within the hollow interior of the tapered converging portion of said housing by said first and second opposite end portion reciprocally journaled within the hollow interior of said first and second sleeve portions, respectfully;
   said second collar means being fixedly attached to the second opposite side of said housing such that the inside diameter of the hollow interior of said second sleeve is substantially equal to the diameter of said second circular aperture, and at least the distal end portion of said second opposite end portion of said rod extending laterally therethrough for communicating with the interior of said housing,
   said exposed distal end portion of said first end portion being normally-urged toward the hollow interior of said housing for locking said tape strip and disenabling it from being able to rewind itself into a coil within the hollow interior of the rounded circular portion of said housing, the distal end portion of said second end portion of said rod being responsive to the application of pressure thereto for shifting said rod toward the interior of said housing thereby disengaging the interior facing annular flange surfaces from gripping the opposite lateral side edges of said tape strip for enabling the withdrawn length of said tape strip to automatically rewind itself back through said slotted aperture and into said coil within the hollow interior of the rounded circular portion of said teardrop-shaped housing.

19. A navigational aid for pilots comprising:
a generally tear-shaped housing having a pair of parallel, spaced apart sides, a rounded portion, a tapered portion, and a substantially hollow interior, each of said sides including a pin aperture extending laterally therethrough, said pin apertures having a common axis and being operatively disposed laterally through the tapered portion of said housing, said housing further including a tape inlet/outlet slot at the vertex of said tapered portion;

an elongated, relatively thin, flat, narrow flexible spring steel strip having a first end portion, an second opposite end portion, an elongated intermediate portion operably disposed between said first and second end portions, an upper surface and a lower surface;

graduation means operatively disposed on both of said upper and lower surfaces of at least said intermediate portion of said elongated strip, said graduation means representing a nautical mile distance scale, a statute mile distance scale, and a kilometer distance scale, said scales on one surface of said strip being calibrated for a first predetermined type of aeronautical chart and said scales on the opposite sides of said strip being calibrated for a second different and distinct type of aeronautical chart;

coil-forming means including at least said second opposite end portion and said intermediate portion of said elongated spring steel strip for normally biasing said portions into a circular coil, said coil-forming means being operatively disposed centrally within the hollow interior of the rounded portion of said housing and including means for anchoring said opposite end portion thereat;

a spring-biased, elongated pin assembly means including a pin means having a first end portion at least partially through extending said pin aperture on one side of said housing, a second opposite end portion at least partially extending through said pin aperture on the opposite side of said housing, and an intermediate pin portion operatively disposed therebetween and within the hollow interior of the tapered portion of said tear-shaped housing, said intermediate pin portion including means for selectively locking and unlocking said strip for releasing it to automatically wind back up into said coil within the hollow interior of said rounded portion of said housing;

said pin means being manually positionable laterally to first and second positions such that one end portion extends a greater distance out of one side of said housing than the other and visa versa, said first and second positions representing said locking and unlocking states, respectively.

20. The navigational aid of claim 19 wherein said intermediate portion of said pin means and at least a portion of said one end portion thereof includes a slotted aperture means disposed diametrically therethrough for operatively receiving said strip for bidirectional movement therethrough, said pin assembly means further including means responsive to said pin means being urged to said first position for gripping the opposite edges of said strip to lock it into position and being further responsive to the manual application of pressure to the opposite end portion of said pin for positioning said pin assembly means to said second position and releasing at least one lateral side edge of said tape strip to enable it to be automatically rewound into said coil means within the hollow interior of the rounded portion of said housing.

21. The navigational aid of claim 20 wherein said pin assembly means further comprises:
a first collar means fixedly mounted to one side of said housing;
a second moveable collar disposed over the opposite end portion of said pin means; and
said pin means being moveable such that said moveable collar moves laterally within the hollow interior of said housing with respect to said fixed collar to selectively engage and disengage the opposite lateral side edges of said tape strip for locking and unlocking the same.

22. The navigational aid of claim 21 further including guide means operatively disposed within the hollow interior of the tapered portion of said housing adjacent said tape inlet/outlet for guiding said tape strip from said coil and through said slotted aperture in said intermediate portion of said pin means through said tape inlet/outlet slot.

23. The navigational aid of claim 22 wherein said guide means includes a cylindrical post operatively disposed between the sides of the tapered portion of said housing and spaced a predetermined distance from said tape inlet/outlet slot for guiding said tape therethrough.

24. The navigational aid of claim 19 wherein said first end portion of said strip includes means for preventing said first end portion from rewinding all the way into the hollow interior of said housing by blocking its entrance into said tape inlet/outlet and for enabling a user to grasp said first end portion from manually pulling said strip out of said tape inlet/outlet for use purposes.

25. The navigational aid of claim 24 wherein said preventing means includes a pair of oppositely disposed ear members disposed on opposite lateral side edges of said strip and adjacent the distal end of thereof, the plane of said ear members being substantially coplanar with one another and with the plane of said strip at that location.

26. The navigational aid of claim 19 wherein the said first end portion of said strip includes an aperture means operatively disposed along the longitudinal axis of said strip for at least one of enabling the user to anchor the aperture at a predetermined location on the aeronautical chart in use and for enabling the user to place said aperture means over a predetermined location on said aeronautical chart for distance-measuring purposes.

27. The navigational aid of claim 19 wherein at least one side of said housing includes a manually-operable push button means responsive to the manual application of pressure thereto for controlling the positioning of said means between said first and second positions.

28. An improved tape measure comprising:
a generally teardrop-shaped housing having a substantially hollow interior, a rounded section including a circular portion, a tapered converging section having a tapered end portion, and a slotted opening operatively disposed at the distal end of said tapered end portion of said tapered converging section;
an elongated tape strip normally self-biased into a wound coil within the hollow interior said circular portion of said rounded section of said housing and having one end passing through said slotted opening;
graduation means operatively disposed on opposite sides of said tape strip, said graduation means including a plurality of different and distinct scales, the graduation means on one side of said strip being calibrated for one particular use and the graduation means on the opposite side of said scale being calibrated for another different and distinct particular use;

manually-operable push button means operatively disposed through at least one side of said housing adjacent the tapered converging section thereof and responsive to being self-biased into a first position for normally gripping the lateral side edges of said tape strip to lock it against automatically rewinding into said coil within the hollow interior of said housing and being responsive to the application of manually-applied pressure thereto for shifting to a second position and releasing the lateral side edges of said tape strip to unlock it thereby enabling it to automatically rewind into said coil within the hollow interior of the circular portion of the rounded section of said housing.

29. The improved tape measure of claim 28 wherein said elongated tape strip includes a relatively thin narrow spring steel strip having a first end portion a second opposite end portion and an elongated intermediate portion operatively disposed between said first and second end portions: and said anchoring means being operatively disposed centrally within said circular rear end portion said opposite second end portion of said tape strip being operatively secured to said anchoring means and the distal end of said first end portion of said tape strip extending out of said slotted opening and including stop means for preventing said first end portion of said tape strip from being rewound into the hollow interior of said housing at least the intermediate portion of said tape strip having an upper tape surface and a lower tape surface.

30. The improved tape measure of claim 29 wherein said plurality of different and distinct scales formed by said graduation means on the upper and lower surfaces of the intermediate portion of said tape strip includes a nautical mile distance scale, a statute mile distance scale, and a kilometer distance scale.

31. The improved tape measure of claim 30 wherein the first surface of said strip is calibrated for one particular use and includes graduation means calibrated for a first particular aeronautical chart.

32. The improved tape measure of claim 31 wherein said first aeronautical chart includes a conventional WAC chart.

33. The improved tape measure of claim 28 wherein said manually-operable push button means includes a elongated cylindrical rod having a first end portion having a first diameter, a second opposite end portion having a second diameter, and an elongated intermediate cylindrical portion having a third diameter, said third diameter being substantially greater than said first and second diameter, slot means operatively disposed diagonally through said cylindrical intermediate portion at least a portion of the interior end of said first end portion for operatively receiving said tape strip for bidirectional movement therethrough, a first collar means operatively and fixedly secured to the interior surface one of said sides of said housing and a second collar means operatively mounted over a second opposite end portion of said elongated cylindrical rod for movement therewith, a spring means, said second collar means being normally biased by said spring means for gripping the lateral side edges of said tape strip between said first and second collar means and locking said strip against rewinding into said coil within the hollow interior of the circular portion of the rounded section of said housing, said elongated cylindrical rod being responsive to the manual application of pressure to the second opposite end portion thereof for moving said second collar means laterally with respect to said first collar means and releasing the lateral side edges of said tape strip for enabling same to automatically rewind into said coil disposed within the hollow interior of the circular portion of the rounded section of said teardrop-shaped housing.

34. The improved tape measure of claim 33 wherein said manually-operable push button means is operatively disposed within the tapered end portion of the tapered converging section of said housing along a central axis defined between the center of said circular portion and said slotted opening, and said elongated cylindrical rod being operatively mounted therein such that the longitudinal axis of said rod is perpendicular with said central axis of said housing, said housing being symmetrical with respect to said central axis and said elongated cylindrical rod being mounted a predetermined distance from said slotted opening and within and through the tapered end portion of the tapered converging section of said teardrop-shaped housing.

35. The improved tape measure of claim 30 wherein said second opposite side of said strip is calibrated for another different and distinct particular use and includes a second different and distinct aeronautical chart.

36. The improved tape measure of claim 35 wherein said second aeronautical chart includes a conventional SECTIONAL chart.

37. The improved tape measure of claim 28 wherein said generally teardrop-shaped housing further comprises:

a symmetrical axis passing through the center of said circular rear end portion and the distal converging end of said tapered front end portion, said diameter being taken perpendicular to said symmetrical axis through the center of said circular rear end portion:

a pair of opposing sides each having a generally teardrop-shaped configuration and each including a generally circular rear end portion and a tapered converging front end portion extending from opposite sides of said diameter of said circular rear end portion perpendicular to said symmetrical axis and tapering inward toward one another:

a first lateral edge portion interconnecting said opposing sides of said circular rear end portion and being generally shaped as a semicircular arc about said circular rear end portion and including a pair of relatively straight, planar, tapering, edge-defining members converging from said diameter of said rear circular end portion toward the distal front end of said tapered converging front end portion:

said pair of planar lateral edge portions terminating at said tapered distal end of said tapered front end portion for forming said slotted opening therebetween and forming an acute angle with respect to one another:

anchoring means operably disposed on the interior-facing surface of one of said opposing sides of said housing and coaxial with said symmetrical axis of said circular rear end portion for securing at least the distal end of said rear end portion of said elongated tape strip thereto for enabling said tape strip to be self-biased for forming a generally circular tape strip coil thereabout:

a generally circular aperture through the other of said pair of opposed sides of said housing disposed along said symmetrical axis of said circular rear end portion for communicating with said anchoring means:

a single fastening means adapted to pass through said circular aperture and operatively engage said anchoring means for joining said opposing sides and said lateral edge portions together to integrally form said housing:

the slope of said converging planar lateral edge portions each being such that said tape strip can be withdrawn from said slotted opening and used with either of said upper and lower surfaces placed flat on the particular aeronautical chart in use depending on which surface said chart is calibrated for:

a pair of laterally-aligned circular apertures one in each of said opposing sides of said housing being operatively disposed through said tapered converging front end portion and located on said symmetrical axis and adjacent to and disposed a predetermined distance from said slotted opening for operatively positioning said manually-operable push button means therebetween.

38. The improved tape measure of claim 28 further including a circular aperture disposed along the longitudinal center line of said tape strip, within said first end portion thereof, and spaced a predetermined distance from the distal front end of said tape strip for enabling the user to pin that end portion of said tape strip to the chart in use for distance-measuring purposes.

39. The improved tape measure of claim 28 wherein said one end of said tape strip which passes through said slotted opening includes stop means for preventing same from being drawn back into the hollow interior of said housing through said slotted opening, said stop means being a plane substantially coplanar with the plane of said tape strip for enabling said tape strip to be laid flat on said chart on either of its upper or lower surfaces without interference.

40. The improved tape measure of claim 29 wherein said plurality of different and distinct scales formed by said graduation means include at least one of a nautical mile distance scale, a statue mile distance scale, and a kilometer distance scale.

41. The improved tape measure of claim 40 wherein said first side of at least the intermediate portion of said tape strip is calibrated with a plurality of distance scales usable with a conventional WAC chart and the second side of at least the intermediate portion of said tape strip is calibrated in a plurality of distance scales usable with a conventional SECTIONAL chart.

42. The improved tape measure of claim 29 wherein said plurality of different and distinct scales formed by said graduation means includes at least two of a nautical mile distance scale, a statute mile distance scale, and a kilometer distance scale.

43. An improved tape-measuring apparatus for (1) a two-sided tape-measuring-type tape strip including a first end portion, an elongated intermediate portion, and an opposite end portion, at least said elongated intermediate portion having a top and a bottom surface, (2) a tape strip housing having a substantially hollow interior and a tape inlet/outlet slot for passing at least said first end portion and said elongated intermediate portion therethrough, (3) anchoring means operably disposed within said hollow interior of said housing for anchoring the distal end of said opposite end portion of said tape strip thereto, (4) at least said opposite end portion of said tape strip including spring steel for self-biasing said tape strip for normally enabling same to automatically rewind into a coil within said hollow interior, (5) spring-biasing means, (6) tape strip edge-gripping means normally responsive to said spring biasing means for locking said tape strip against longitudinal movement into said inlet/outlet slot, (7) manually-operable push button means responsive to the application of manually-applied pressure thereto for unlocking said edge-gripping means and enabling said tape to be automatically drawn back into the hollow interior of said housing automatically wound onto said coil, the improvement comprising:

a pair of teardrop-shaped opposing sides:

a continuous unbroken edge portion operatively connecting said pair of teardrop-shaped opposing sides, the lateral width of said edge portion being greater than the lateral width of said tape strip:

said pair of teardrop-shaped sides and side edge portions matedly joining to form a closed tape housing having a hollow interior:

said housing having a rear portion including a generally circular section having a central axis and a generally rounded rear end in the shape of a semicircle:

said tape housing further including a triangular front portion whose vertex includes means for forming said tape inlet/outlet slot and whose base joins said circular section on opposite sides of a diameter taken therethrough:

said housing further having a symmetrical axis defined through the central axis of said circular section and bisecting the tapering legs of said triangular front portion and said vertex, said diameter being perpendicular to said symmetrical axis: and said coil being operably disposed in the hollow interior of said, circular section whereas said spring biasing means, said edge-gripping means, and said push button means are operably disposed within the hollow interior of said triangular front portion.

44. The improvement of claim 43 wherein said housing includes a first aperture in one side of said triangular portion, a second opposite aperture in the opposing side of said triangular portion, said apertures being coaxial with one another, and wherein said manually-operable push buitton means includes a generally cylindrical member having one end operatively received within said first aperture for reciprocal movement therein, an opposite end operatively received through said second opposing aperture for reciprocal movement therein, and an elongated, intermediate portion therebetween, said elongated intermediate portion being housed within said hollow interior of said triangular portion of said tape housing, an elongated tape strip slot operably disposed diagonally through substantially the entire length of said elongated intermediate portion of said cylindrical member and through a predetermined portion of at least said first end portion adjacent said elongated intermediate cylindrical portion for passing said tape strip bidirectionally through said elongated tape strip slot, the width of said slot being greater than the width of said tape strip for enabling lateral movement within said hollow interior: and said first and second slots and said cylindrical member being coaxial with one another and being operatively disposed through the opposing sides of said triangular front portion of said tape housing along said symmetrical axis thereof and spaced a predetermined distance to the rear of said inlet/outlet slot.

45. The improvement of claim 43 wherein said tape strip housing includes a rounded rear portion having a circular section for housing said coil of elongated tape strip and a triangular front portion, wherein the base of said triangular front portion is a diameter through the center of said circular section, each of the other two legs of said triangular front portion being of equal length and tapering inwardly toward the front end vertex thereof so as to form an acute angle at said inlet/outlet slot of said housing, said symmetrical axis of said housing bisecting said triangular front portion and said vertex and being normal to said diameter forming the base of said triangular front portion, the lateral edges of said triangular front portion connecting said opposing sides of said housing being relatively straight and flat along the length of said legs of said triangular front portion for enabling said housing to be placed level on a surface with either of said lateral legs being operably disposed flat thereon for enabling the user to use a selected one of the surfaces of said tape strip with equal ease.

* * * * *